United States Patent
Phillips et al.

(10) Patent No.: US 9,407,333 B2
(45) Date of Patent: Aug. 2, 2016

(54) INDUCTIVE COUPLING FOR BATTERY SHARING AND MULTI-FUNCTION INDUCTIVE ANTENNA

(71) Applicant: MasterCard International Incorporated, Purchase, NY (US)

(72) Inventors: Simon Phillips, York (GB); Alan Johnson, Essex (GB); Simon Collins, Guildford (GB)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 14/528,883

(22) Filed: Oct. 30, 2014

(65) Prior Publication Data

US 2016/0127011 A1    May 5, 2016

(51) Int. Cl.
| | |
|---|---|
| *H04B 7/00* | (2006.01) |
| *H04B 5/00* | (2006.01) |
| *H04B 1/38* | (2015.01) |
| *H04W 4/00* | (2009.01) |
| *H04B 1/3883* | (2015.01) |
| *H04W 88/06* | (2009.01) |

(52) U.S. Cl.
CPC ............ *H04B 5/0037* (2013.01); *H04B 1/3883* (2013.01); *H04B 5/0093* (2013.01); *H04W 4/008* (2013.01); *H04W 88/06* (2013.01)

(58) Field of Classification Search
CPC ...... H02J 7/025; H04B 5/0031; H04B 5/0037
USPC .......... 455/41.1–41.3, 572–573, 274
See application file for complete search history.

(56) References Cited

U.S. PATENT DOCUMENTS

| | | | |
|---|---|---|---|
| 7,863,856 B2 | 1/2011 | Sherman et al. | |
| 8,111,042 B2 * | 2/2012 | Bennett | G06Q 20/3674 307/149 |
| 8,432,293 B2 * | 4/2013 | Symons | H02J 7/025 320/106 |
| 8,862,054 B2 * | 10/2014 | Ishizaki | H02J 17/00 455/41.1 |
| 9,035,603 B2 * | 5/2015 | Endo | H02J 7/025 320/108 |
| 2009/0170559 A1 | 7/2009 | Phillips | |
| 2010/0222010 A1 * | 9/2010 | Ozaki | H02J 5/005 455/77 |
| 2011/0241607 A1 | 10/2011 | Wiegers | |
| 2012/0062174 A1 * | 3/2012 | Kamata | H02J 7/025 320/108 |
| 2012/0235636 A1 * | 9/2012 | Partovi | H02J 7/025 320/108 |

(Continued)

FOREIGN PATENT DOCUMENTS

WO    2014/006619 A1    1/2014

OTHER PUBLICATIONS

"PCT International Search Report and Written Opinion" dated Dec. 28, 2015, issued by the International Searching Authority in corresponding Application No. PCT/US15/55775, 7 pages.

*Primary Examiner* — Simon Nguyen
(74) *Attorney, Agent, or Firm* — Buckley, Maschoff & Talwalkar LLC

(57) ABSTRACT

A mobile device includes a housing and an antenna. The mobile device further includes a power-receiving circuit, and power-transmitting circuit, and a short-range communications circuit. The antenna performs multiple functions in that it is shared by the power-receiving circuit, the power-transmitting circuit and the short-range communications circuit. Each of the three circuits is selectively connectable to the antenna. The mobile device is configured to participate in a mobile-to-mobile battery-charge-sharing operation via inductive coupling from mobile device to mobile device.

3 Claims, 6 Drawing Sheets

(56) References Cited

U.S. PATENT DOCUMENTS

| | | | | |
|---|---|---|---|---|
| 2013/0005252 A1* | 1/2013 | Lee | ............ | H04B 5/0037 455/41.1 |
| 2013/0020988 A1* | 1/2013 | Kim | ............ | H02J 7/0013 320/108 |
| 2013/0157565 A1 | 6/2013 | Clement et al. | | |
| 2013/0225077 A1* | 8/2013 | Schultz | ............ | H02J 7/025 455/41.1 |
| 2013/0260676 A1* | 10/2013 | Singh | ............ | H04B 5/0037 455/41.1 |
| 2013/0324038 A1* | 12/2013 | Kajihara | ............ | H04B 5/0031 455/41.1 |
| 2014/0117927 A1 | 5/2014 | Chateau et al. | | |
| 2014/0168012 A1* | 6/2014 | Mankowski | ............ | H04W 4/20 342/359 |
| 2015/0180270 A1* | 6/2015 | Takano | ............ | H02J 7/025 320/103 |
| 2015/0215005 A1* | 7/2015 | Toivanen | ............ | H04B 5/0037 455/41.1 |
| 2015/0244176 A1* | 8/2015 | Van Den Brink | ............ | H02J 5/005 307/104 |
| 2015/0349537 A1* | 12/2015 | Milne | ............ | H02J 5/005 307/104 |
| 2015/0349572 A1* | 12/2015 | McCoy | ............ | H02J 7/025 320/103 |
| 2015/0371771 A1* | 12/2015 | Abu Qahouq | ............ | H04B 5/0087 307/104 |

* cited by examiner

2

INDUCTIVE COUPLING FOR BATTERY SHARING AND MULTI-FUNCTION INDUCTIVE ANTENNA

BACKGROUND

So-called "smartphones" are in widespread use. Examples of such devices include the famous iPhone® marketed by Apple Inc., and devices that are substantially similar in appearance to the iPhone and run the well-known Android® mobile operating system distributed by Google Inc. In addition to conventional mobile telephone functions, smartphones provide a wide array of computing functions in a form-factor that fits in a user's pocket or handbag. For some users, smartphones are a highly convenient tool and also an entertainment resource; for other users, the value of their smartphones goes beyond convenience or entertainment, with the devices serving as digital companions, helpers and focal points for numerous aspects of the users' business and/ or personal lives.

Smartphones are not the only type of widely-used device with mobile communication capabilities. Many people also carry tablet computers, which in many ways resemble smartphones, but which provide added convenience and usefulness through larger touchscreen interfaces, more highly functional virtual keyboards, etc.

Both smartphones and tablet computers include rechargeable batteries, which are the power source for the devices, except for the usually limited periods of time when the devices may be plugged into an electrical power outlet via a charging device. For most users, because they rely on their smartphones and/or tablets in many ways, recharging the battery in those devices is a routine but highly important activity, and sometimes entails inconvenience or a sense of being in a predicament. The latter may occur when the user finds that the battery charge on the device is low, but he/she is unable to recharge the device because no power outlet is available, or the user is on the go, or the user has forgotten to carry the necessary charging device.

Published patent application WO2014006619 presents a proposal that could ameliorate potential mobile device charging inconvenience or predicaments in situations where no power outlet is available. According to this proposal, battery charge could be shared from one mobile device to another via a charging cable that connects the USB port of one device to the USB port of the other. One potential drawback of this proposal is that it still requires a user to have a suitable cable at hand if the charge sharing operation is to occur.

DETAILED DESCRIPTION

In general, and for the purpose of introducing concepts of embodiments of the present disclosure, one mobile device may provide a battery charge to another via inductive coupling from one device to the other. The inductive coupling may be between respective loop antennas included in the two devices. In some embodiments, the loop antennas may serve multiple functions, in that they may be of the type often provided in mobile devices to support NFC (near field communication) capabilities in the mobile device. Switches may be provided in the mobile devices to selectively connect and disconnect the NFC circuitry and the charging circuitry to and from the multi-function antenna. The devices may be programmed with a mobile application program (or "app") to facilitate user control of the devices to initiate and manage mobile-to-mobile charging operations.

Figure 1:
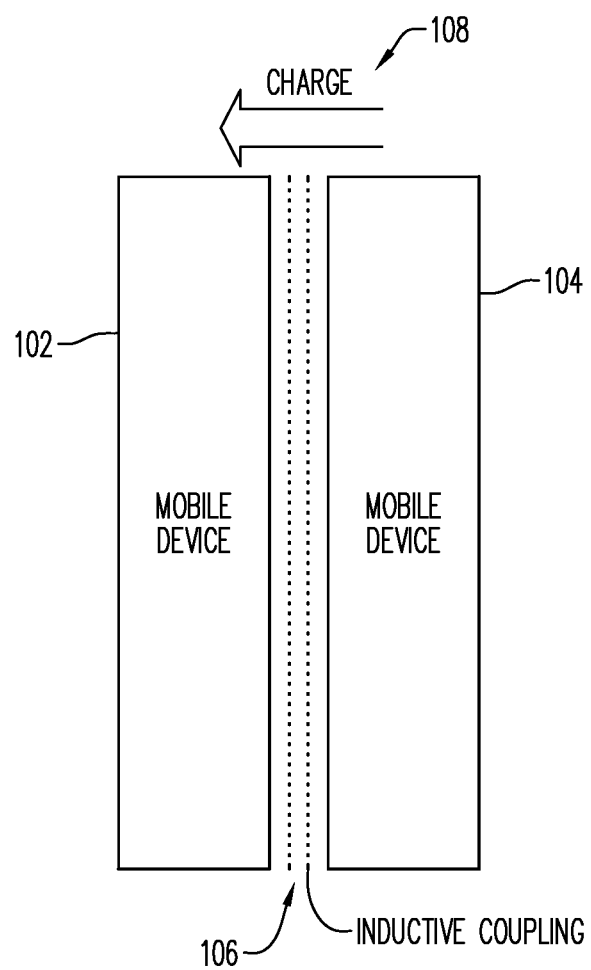
FIG. 1 schematically illustrates a mobile-to-mobile charging operation according to aspects of the disclosure.

FIG. 1 schematically illustrates a mobile-to-mobile charging operation according to aspects of the disclosure. In FIG. 1, two mobile devices (reference numerals 102 and 104) are shown in proximity to each other. The two devices may be, for example, smartphones that are configured for mobile-to-mobile charge sharing, as described in more detail below. The mutually relative positioning of the two devices 102, 104, and their internal construction, may be such that inductive electrical coupling (reference numeral 106) is established between the two devices. As schematically indicated at 108 in FIG. 1, electrical charge is transferred via the inductive coupling 106 from device 104 to device 102 (i.e., from the battery of device 104 to the battery of device 102—these batteries are not explicitly depicted in FIG. 1 apart from the devices 102, 104).

For convenience of illustration, the two devices are shown in a vertical orientation, with a slight space therebetween. However, in some practical embodiments of the disclosure, device 104 (the charge-transmitting device or "donor device") may be placed face down on a flat horizontal surface during a charging operation, while device 102 (the charge-receiving device or "recipient device") may be allowed to rest on the upper (i.e., rear) surface of the housing of device 104 with the device 102 in a horizontal orientation like device 104, and with the rear surface of the housing of device 102 in contact with and resting on the rear surface of the housing of device 104. With such positioning of the devices 102, 104, it may be the case that a loop antenna (discussed below, not shown in FIG. 1) in one of the devices is located in proximity to a loop antenna (also discussed below and not shown in FIG. 1) in the other device, with the positioning, orientation and configurations of the two loop antennas being such as to produce the inductive coupling between the two devices as schematically shown at 106 in FIG. 1.

Because device 102 is receiving the charge, it may in some contexts be referred to as the "charge-receiving" device or the "target" device. Because device 104 is providing the charge, it may in some contexts be referred to as the "charge-transmitting" device, or simply the "charging" device.

Figure 2:
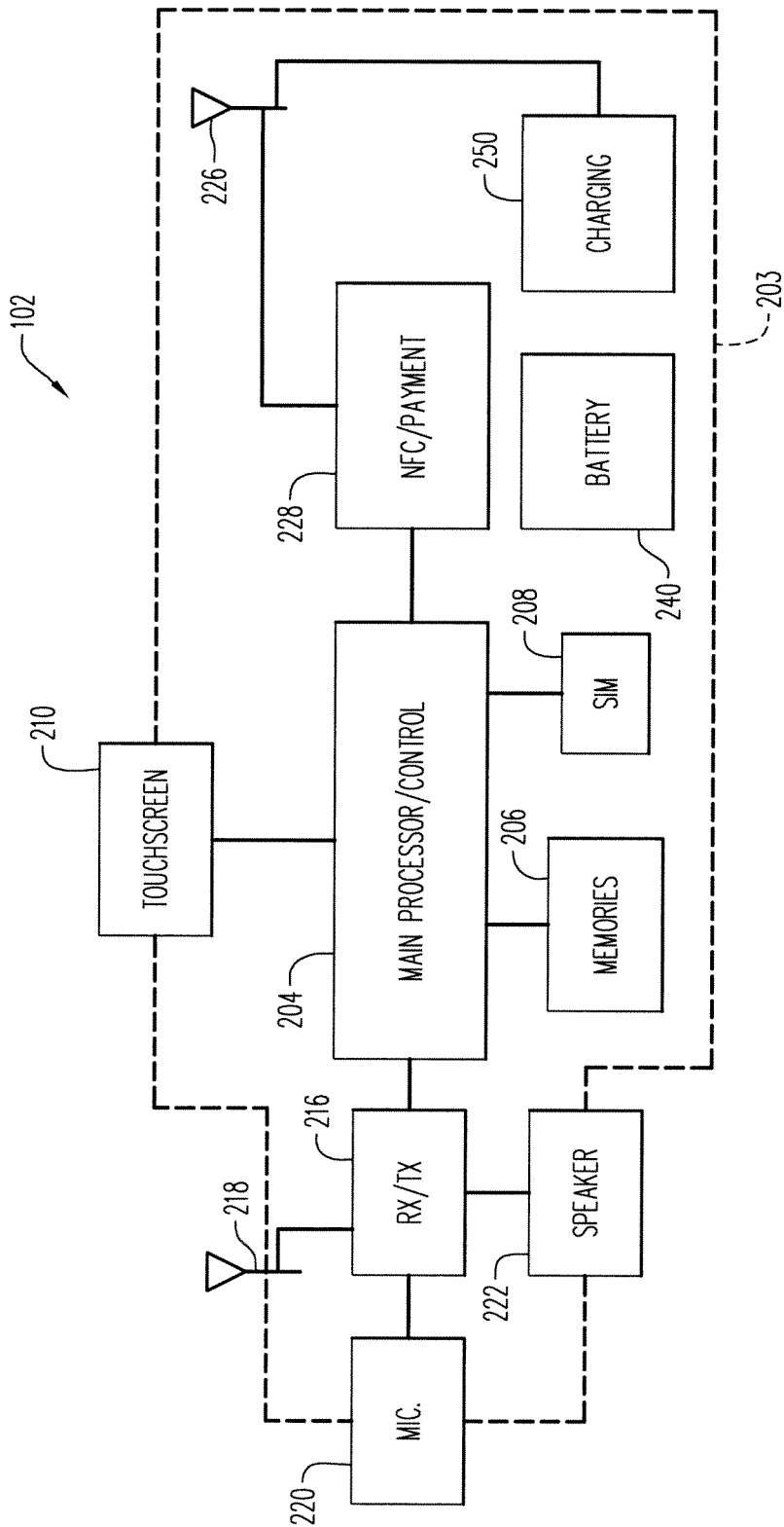
FIG. 2 is a schematic block diagram of a smartphone according to some embodiments.

FIG. 2 is a schematic block diagram of an example embodiment of the mobile device 102. (FIG. 2 does not necessarily represent the physical layout of the mobile device 102.) In many respects, the mobile device 102 may be conventional, but in addition it may have hardware features, and optionally, may run one or more software programs as well, to support the mobile-to-mobile battery charging as described above in general terms in connection with FIG. 1. The ensuing discussion of FIG. 2 assumes that mobile device 102 is a smartphone in terms of its general constitution. In at least some cases, mobile device 104 may have the same or substantially the same hardware and other features as now will be described with reference to FIG. 2. Alternatively, mobile device 104 may differ in some respects from mobile device 102, or may be in a different class of device, such as a tablet computer.

The mobile device 102 may include a conventional housing (indicated by dashed line 203 in FIG. 2) that contains and/or supports the other components of the mobile device 102. The mobile device 102 further includes conventional processor/control circuitry 204, for controlling over-all operation of the mobile device 102. For example, the control circuitry 204 may be mainly or entirely constituted by a conventional mobile processor, which may be controlled by a mobile operating system (OS) and other programs. The other programs may include application programs ("apps").

Other components of the mobile device 102, which are in communication with and/or controlled by the control circuitry 204, include: (a) one or more memory devices 206 (e.g., program and working memory, etc.); (b) a conventional SIM (subscriber identification module) card 208; and (c) a conventional touchscreen 210 which may be, as is typical in smartphones, a key portion of the user interface for the mobile device 102. Further, the mobile device 102 have include manually-actuatable switches/buttons which are not shown in the drawing, and which may include an on/off/reset switch, a menu button, a "back" button, a volume control switch, etc.

Program instructions that program and control the control circuitry 204 may be stored in the memory devices 206.

The mobile device 102 also includes conventional receive/transmit circuitry 216 that is also in communication with and/or controlled by the control circuitry 204. The receive/transmit circuitry 216 is coupled to an antenna 218 and provides the communication channel(s) by which the mobile device 102 communicates via the mobile network (not shown). The mobile device 102 further includes a conventional microphone 220, coupled to the receive/transmit circuitry 216. Of course, the microphone 220 is for receiving voice input from the user. In addition, a speaker 222 is included to provide sound output to the user, and is coupled to the receive/transmit circuitry 216.

In conventional fashion, the receive/transmit circuitry 216 operates to transmit, via the antenna 218, voice signals generated by the microphone 220, and operates to reproduce, via the speaker 222, voice signals received via the antenna 218. The receive/transmit circuitry 216 may also handle transmission and reception of text messages and/or other data communications via the antenna 218.

The mobile device 102 may also include a loop antenna 226. The loop antenna 226 may, for example, be of the kind that has been proposed for inclusion in smartphones in order to provide NFC (near field communication) capabilities as part of an adaptation of smartphones to serve as payment devices in place of contactless payment cards. One example prior proposal for a payment-enabled mobile device is disclosed in U.S. published patent application no. 2009/0170559, which is commonly assigned herewith. An NFC circuit 228 may be included in the mobile device 102 and may be selectively connectable to the loop antenna 226. The NFC circuit may be conventional and may provide communication functionality via the loop antenna 226 in accordance with the well-known NFC standard. A purpose of the NFC capability in the mobile device 102 may be to enable short-range communications with a point of sale (POS) terminal/payment card reader (not shown) in connection with a payment card account transaction at a retail store. Accordingly, the NFC circuit may also, for example, be associated with circuitry (e.g., a secure element or "SE"; not separately shown) which runs one or more payment applications configured to handle payment card account transactions at the point of sale. For example, the payment application(s) may emulate the functionality of contactless payment IC (integrated circuit) cards. The NFC circuit 228 and/or its associated payment circuitry may be in communication with the device main control circuitry 204.

Like any typical mobile device, mobile device 102 also includes a rechargeable battery 240. The battery may be contained within the device housing 203 and/or may be constituted by a battery pack that in part makes up a portion of the housing 203. The battery 240 may be substantially conventional, apart from its connection/interactions with the mobile-to-mobile charge-sharing features described herein and provided in accordance with aspects of the present disclosure. It will be appreciated that the battery 240, via appropriate power supply circuits (not shown), may be coupled as a power source to all of the electrical/electronic components of the mobile device 102. In some situations, and in accordance with aspects of the present disclosure, the battery 240 may also serve as a source of recharging energy for a rechargeable battery in another device.

Still further, the mobile device 102 may include charging circuitry 250 that is provided in accordance with aspects of the present disclosure. Details of the charging circuitry 250 will be described below. In some embodiments, the charging circuitry 250 may include capabilities to both receive and transmit electrical charge from/to another device. The charging circuitry 250 may be selectively connectable to the loop antenna 226. Accordingly, and reflecting aspects of the present disclosure, the loop antenna 226 may function in more than one way, i.e., for short-range communications at some times and for mobile-to-mobile battery charge sharing operations at other times.

Figure 3:
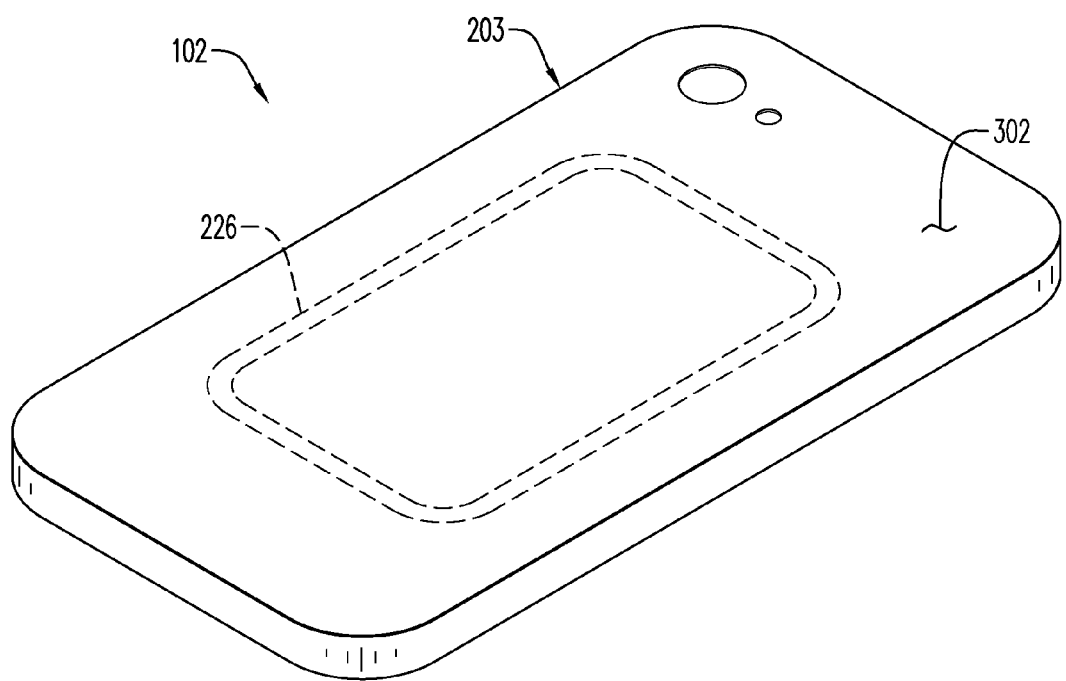
FIG. 3 is a schematic isometric view of an embodiment of the smartphone illustrated in FIG. 2

FIG. 3 is a schematic, isometric rear view of the mobile device 102, showing the locus of the loop antenna 226 as it may be provided in accordance with some embodiments. The loop antenna 226 may be adjacent the rear surface 302 of the housing 203 of the mobile device 102. The actual number of loops in the loop antenna 226 may be more or less than the number of loops schematically shown in the drawing.

Figure 4:
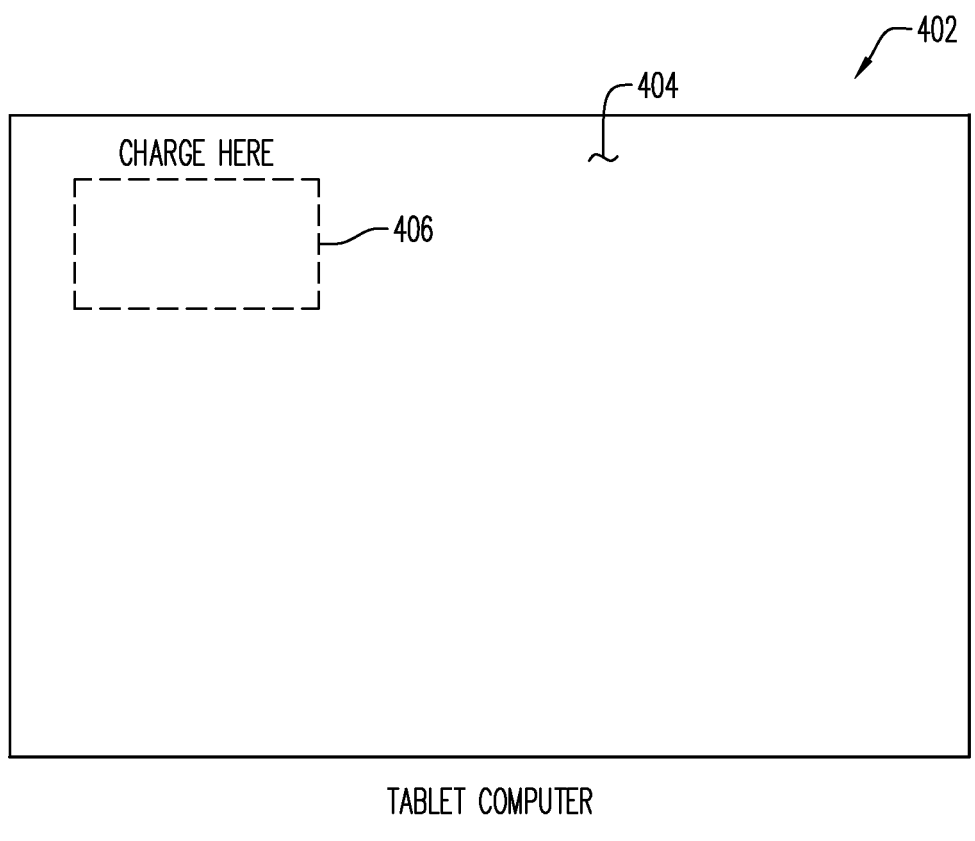
FIG. 4 is a schematic bottom plan view of a tablet computer provided in accordance with aspects of the disclosure.

FIG. 4 is a schematic bottom plan view of a tablet computer 402 provided in accordance with aspects of the disclosure. To a large extent, the tablet computer 402 may be constituted in a conventional manner. However, in addition to its conventional features, the tablet computer 402 may include functionality that allows it to engage in mobile-to-mobile charge sharing in accordance with principles as disclosed herein. At least, for example, the tablet computer 402 may include capabilities for being inductively coupled to a suitably equipped smartphone so as to transmit charging energy for the battery of the smartphone. It will be appreciated that the mobile device 102 may be such a smartphone.

To facilitate use of the tablet computer 402 as a charge donor (in other words, a charge-transmitting device), the back surface 404 of the housing of the tablet computer 402 may include a marked region 406 to indicate where a smartphone should be placed on the back surface 404 of the tablet computer 402 in order to inductively couple the two devices to share battery charge from the tablet computer 402 to the smartphone that is to be charged. A loop antenna component (not separately shown) of the tablet computer 402 may be adjacent the marked region 406.

Figure 5:
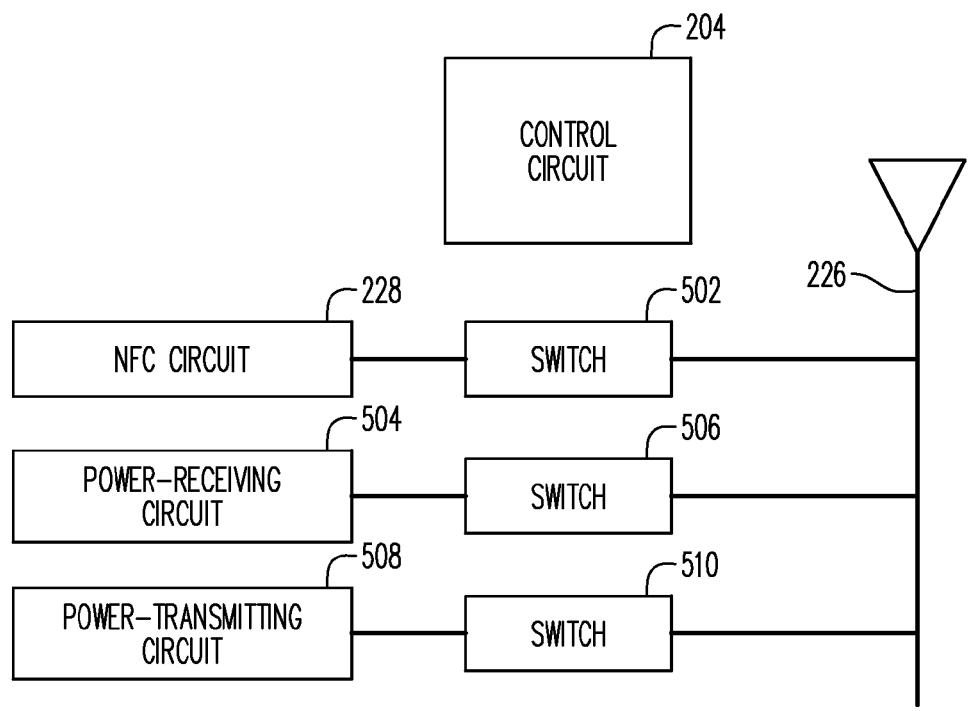
FIG. 5 is a schematic block diagram that illustrates additional aspects of the smartphone of FIGS. 2 and 3, according to some embodiments.

FIG. 5 is a block diagram that illustrates further aspects of some embodiments of the mobile device 102. For example, loop antenna 226, as in FIG. 2, is again schematically represented in FIG. 5. Also, the above-discussed NFC circuit 228 is shown in FIG. 5, and is depicted as being connected to loop antenna 226 via a switch 502. The switch 502 is switchable between one state in which it operatively couples the NFC circuit 228 to the loop antenna 226 and another state in which the switch 502 effectively de-couples the NFC circuit 228 from the loop antenna 226. Thus, in operational terms, the NFC circuit 228 is selectively connectable to the loop antenna 226 via the switch 502.

Also shown in FIG. 5 is a power-receiving circuit 504, which may be an aspect of the charging circuitry 250 that is shown in FIG. 2. In some embodiments, the design of the power-receiving circuit 504 may be in accordance with principles that guide the design of mobile device circuitry that is configured for charging a device battery by placing the device on an inductive charging pad to receive electrical energy via inductive coupling to the charging pad.

The circuitry shown in FIG. 5 also includes a switch 506 by which the power-receiving circuit 504 connected to the loop antenna 226. The switch 506 is switchable between one state in which it operatively couples the power-receiving circuit to the loop antenna 226 and another state in which the switch 506 effectively de-couples the power-receiving circuit 504 from the loop antenna 226. Thus, in operational terms, the power-receiving circuit 504 is selectively connectable to the loop antenna 226 via the switch 506. The power-receiving circuit 504 may also be coupled to the battery 240 (FIG. 2, not shown in FIG. 5) to supply electric charge to the battery 240.

Also included in the circuitry shown in FIG. 5 is a power-transmitting circuit 508, which also may be an aspect of the charging circuitry 250 shown in FIG. 2. In some embodiments, the power-transmitting circuit 508 may be arranged in accordance with principles that guide the design of the active elements of conventional charging pads for mobile devices. (An example disclosure of circuitry for a charging pad is found in U.S. Pat. No. 8,248,024). The battery 240 (FIG. 2, not shown in FIG. 5) may be coupled to the power-transmitting circuit 508 to provide power to the latter.

The circuitry illustrated in FIG. 5 further includes a switch 510 by which the power-transmitting circuit 508 is connected to the loop antenna 226. The switch 510 is switchable between one state in which it operatively couples the power-transmitting circuit 508 to the loop antenna 226 and another state in which the switch 510 effectively de-couples the power-transmitting circuit 508 from the loop antenna 226. Thus, in operational terms, the power-transmitting circuit 508 is selectively connectable to the loop antenna 226 via the switch 510.

Also shown in FIG. 5 is a control circuit, which may be assumed to be the control circuitry 204 shown in FIG. 2. By connections which are not shown, the control circuit 204 may transmit control signals to, and may possibly receive status and/or sensing signals from the components 228, 502, 504, 506, 508 and 510 shown in FIG. 5. Thus all of the latter components may effectively be under control by the control circuit 204. The control circuit 204 may be programmed to operate the switches 502, 506 and 510 such that not more than one of the NFC circuit 228, the power-receiving circuit 504 and the power-transmitting circuit 508 is operatively coupled to the loop antenna 226 at any particular time. Thus, according to programmed operations of the control circuit 204, when one of the components 228, 504 and 508 is operatively coupled to the loop antenna 226, the other two of such components may be de-coupled from the loop antenna 226, and the control circuit 204 may control the states of the switches 502, 506 and 510 accordingly. The control circuit 204 may also turn the components 228, 504 and 508 on and off and otherwise control their operation.

With this arrangement, the loop antenna 226 may be shared among the NFC circuit 228, the power-receiving circuit 504 and the power-transmitting circuit 508, with the loop antenna 226 accordingly serving as a multifunction component of the mobile device 102. That is, the loop antenna may at any one time, depending on the circumstances, and pursuant to programmed control operations of the control circuit 204, be used for short-range communications or a power-receiving operation or a power-transmitting operation. With the arrangement shown in FIG. 5, the mobile device 102 may either donate or receive battery charge to/from another mobile device in accordance with principles disclosed herein.

In some embodiments, the connections of the components 228, 504 and 506 to the loop antenna 226 may vary in terms of the number of loops of the antenna 226 to which the respective component is effectively coupled (when in an operationally coupled condition) by the respective switch. Thus, for example, if the loop antenna 226 in total consists of N turns, the switch 502 in its coupling state may couple the NFC circuit 228 to the loop antenna 226 such that all of the N loops are effectively coupled to the NFC circuit 228. On the other hand, it may be the case that when the power-receiving circuit 504 is operationally coupled to the loop antenna 226 by the switch 506, only M turns of the loop antenna 226 may be effectively coupled to the power-receiving circuit 504. It is assumed for the previous discussion that N and M are positive integers, with N>M. Other possible arrangements may alternatively be employed. In any event, it may be the case that the switches 502, 506 and 508 connect to the loop antenna 226 at different points on the loop antenna 226.

Figure 6:
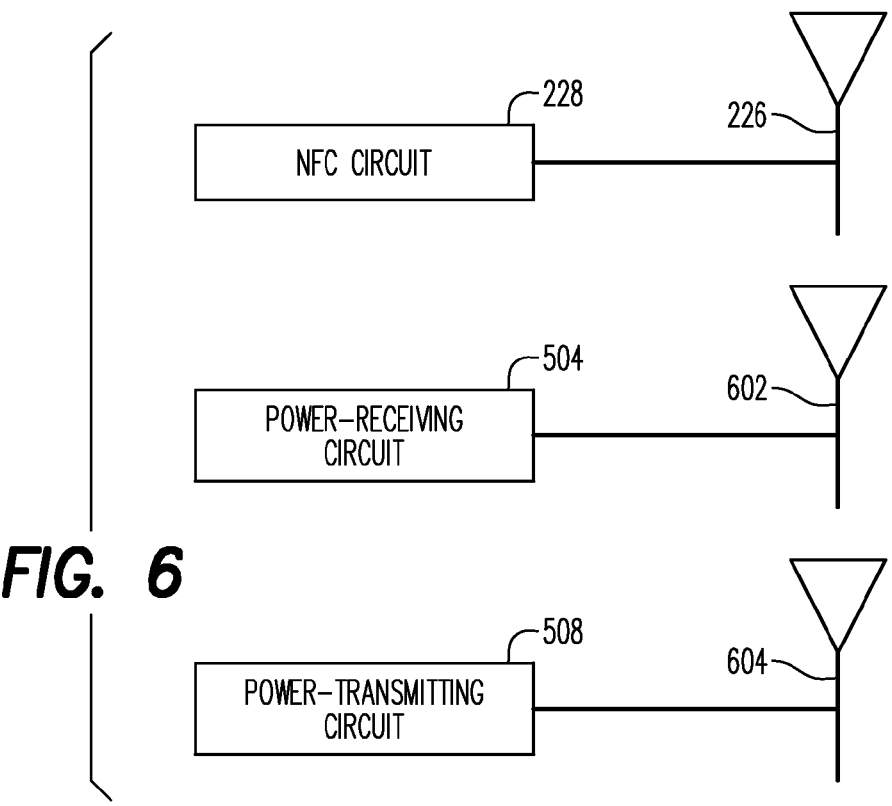
FIG. 6 is a schematic block diagram that illustrates additional aspects of the smartphone of FIGS. 2 and 3, according to some alternative embodiments.

In some embodiments, the functionality made possible by the arrangement illustrated in FIG. 5 may alternatively be provided without using a single antenna for multiple functions. FIG. 6 is a block diagram showing an alternative embodiment which includes additional dedicated loop antennas 602 and 604, respectively coupled to the power-receiving circuit 504 and the power-transmitting circuit 508. It will be noted that, in the embodiment of FIG. 6, the switches 502, 506, 510 of FIG. 5 are not present, and that the NFC circuit 228 may be directly coupled to antenna 226. Thus the circuit/antenna arrangement of FIG. 6 may replace the arrangement shown in FIG. 5. In the arrangement of FIG. 6, the components 228, 504, 508 may again be operated under the control of the control circuit 204, which is not shown in FIG. 6. In some embodiments, instead of three loop antennas, as in FIG. 6, or one antenna connectable at various times to three operating circuits, as in FIG. 5, there may alternatively be two loop antennas provided, with at least one of the two loop antennas shared by two of the three operating circuits, and thus serving multiple functions. Thus, for example, in one embodiment, there may be a dedicated loop antenna for short-range communication functions, while another loop antenna is selectively used for power-receiving operations and for power-transmitting operations.

Figure 7:
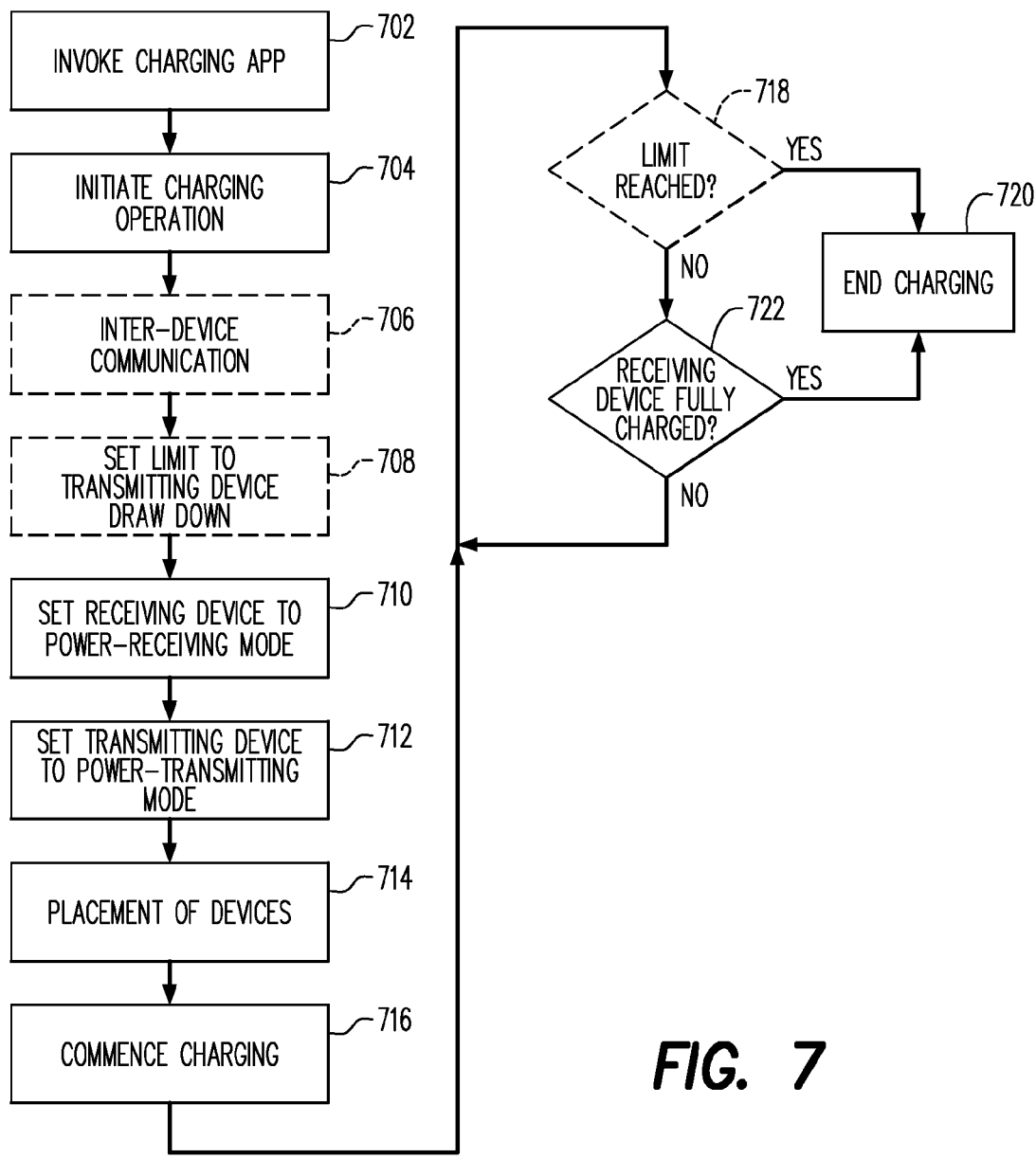
FIG. 7 is a flow chart that illustrates a process that may be performed in accordance with aspects of the disclosure.

FIG. 7 is a flow chart that illustrates a process that may be performed in accordance with aspects of the disclosure.

At block 702 in FIG. 7, as one example way of initiating a mobile-to-mobile charge sharing operation, a user of a mobile device (say device 102 in FIG. 1) may launch an application program (an "app") that has been installed in the device 102 in accordance with teachings of the present disclosure. For present purposes, it is assumed that the mobile device 104 is in proximity to the device 102 at the time block 702 is performed, and further it is assumed that a similar or complementary app has been installed in the device 104. In some embodiments, both devices 102 and 104 may be smartphones. In other embodiments, among other possibilities, the device 102 may be a smartphone and the device 104 may be a tablet computer.

At block 704, the user may interact with the app in the device 102 to indicate that the user wishes to initiate a charging operation (i.e., an operation for providing electrical charge to the battery of the device 102 from another mobile device). For example, in some embodiments, the launching of the app in the device 102 may cause the device 102 to display one or more user-actuatable options on the touchscreen of the device 102, including an option to commence a charging operation. Accordingly, block 704 may in some embodiments be performed by and in response to the user selecting an option via the app to initiate charging.

Optionally, in some embodiments of the process of FIG. 7, block 706 may follow. At block 706, the app in device 102 may engage in data communications with the app in device 104 to handle preliminary matters and set-up in connection with the proposed charge sharing operation. In some embodiments, for example, this communication may be via NFC between the devices 102 and 104. Accordingly, it may be assumed for purposes of block 706 that both devices 102 and 104 are in an NFC communication operating mode. It may be further assumed that in some embodiments, a respective shared loop antenna (e.g., item 226 in FIGS. 2 and 5) is coupled via a switch (e.g., item 502 in FIG. 5) to a respective NFC circuit 228 (FIG. 5) in the device 102 or 104.

In some embodiments, the inter-device communication from device 102 to device 104 (from app to app) may include a request that the device 104 serve as a charge donor to device 102. As an initial step, the inter-device communication may cause the corresponding app to launch on device 104, and may result in a suitable announcement/prompt/set of options to be displayed on the touchscreen of device 104.

In some embodiments, block 708 may optionally follow. Block 708 is concerned with operation of the app in the donor device 104 such that—in the charge sharing operation which is contemplated—no more than a certain amount of charge is to be removed from the battery of the donor device 102. In other words, block 708 may be concerned with setting a limit on the charge to be drawn down from donor device 104. For example, the limit may be defined in terms of an amount of charge that is to remain in the donor device at the completion of the charge-sharing operation. In some embodiments, for example, the touchscreen of donor device 104 may display a number of relevant options to the user of donor device 104 (who may be the same individual as the user of recipient device 102). These options could include, for example, "Unlimited charge draw down"/"Decline charging operation"/"Stop charging if battery down to 50%"/"Stop charging if battery down to 25%", etc. In other embodiments, for example, there could be a yes/no prompt, such as "Set limit to charge draw down?" In the latter example, if the user indicates "yes," the next prompt may direct the user to set or select a limit, e.g., by filling in a data entry with a number between 0 and 100 to indicate the limit down to which charge may be drawn from the donor device 104.

While the immediately preceding discussion has suggested that the user be prompted and that the user interact with the user interface of donor device 104 to limit charge drawdown from the donor device 104, it may alternatively be the case, via cooperation between the apps in devices 102 and 104, that the user may provide input via the user interface of recipient device 102 to limit the charge to be drawn down from the donor device 104.

In any event, block 710 may follow in the process of FIG. 7. In block 710, the app in recipient device 102 may cause the recipient device to be placed in a mode of operation for receiving charge from another mobile device. For example, the control circuit (item 204 in FIG. 5) may control the switch 506 (shown in FIG. 5) to place the switch 506 in its state to operatively couple the power-receiving circuit 504 to the loop antenna 226, while placing switches 502 and 510 in states such that components 228 and 508 are operatively de-coupled from the loop antenna 226. At the same time, a message may be displayed on the touchscreen of recipient device 102 to indicate that the recipient device 102 is in power-receiving mode.

Moreover, block 712 may also be performed. (It is assumed for the purposes of the ensuing discussion of block 712 that the hardware and/or control and/or software arrangement of donor device 104 corresponds to that of recipient device 102, particularly as illustrated in FIG. 5). In block 712, the app in donor device 104 may cause the donor device to be placed in a mode of operation for transmitting charge to another mobile device. For example, the control circuit (item 204 in FIG. 5) may control the switch 510 to place the switch 510 in its state to operatively couple the power-transmitting circuit 508 to the loop antenna 226 of the donor device 104, while placing switches 502 and 506 in states such that components 228 and 504 in donor device 104 are operatively de-coupled from the loop antenna 226 of the donor device 104. It may also be the case in connection with block 712, that the touchscreen of the donor device 104 may display a message to indicate that the donor device 104 is in a power-transmitting mode.

At block 714, the user or users may place the devices 102 and 104 relative to each other such that the above-mentioned inductive coupling takes place between the two devices. For example, the coupling may take place between respective loop antennas included in the devices 102 and 104. It may be the case that it is preferable for the relative placement of the two devices to include placing the respective housings of the devices in contact with each other, e.g., back to back (assuming, for example, that the respective loop antennas are adjacent the back wall in the housing of each device). Optionally, one or both of the touchscreens on the devices 102 and 104 may present an animation or otherwise provide guidance to the user(s) to guide him/her/them to place the devices as required for the inductive coupling to occur.

At block 716 the transfer of charge from the donor device to the recipient device occurs. This may be initiated automatically by the app or apps in the devices or in response to a specific signal or signals input into one or both of the devices by the user(s). It may typically be the case that the charge-sharing which occurs at block 716 takes place at a time when the donor device 104 is not connected to any external source of electrical power, although the charge-sharing also may occur at a time when the donor device 104 is connected to an external power source (presumably through a charging cable that is incompatible with recipient device 102).

During the charging operation, the power-transmitting circuit 508 of the donor device 104 may excite the loop antenna 226 of the donor device in a manner that may be optimized to promote relatively rapid transfer of charge to the recipient device 102. For example, the frequency of excitation and/or the amount of current may be selected and/or pulsing and/or current modulation and/or variation in frequency may occur in such a way as to allow for charging of a typical recipient device to be completed within a few minutes.

Optionally, in some embodiments of the process of FIG. 7, a decision block 718 may be included in the process flow after commencement of charging at block 716. More specifically, decision block 718 may be present if a limit has been set as to the amount of charge to be drawn from the donor device 104. At block 718, the donor device 104 (e.g., via the app in that device and/or the control circuit 204 of that device) may determine whether the charge draw down limit set at block 708 has been reached. If so, then the charge sharing operation may be ended (block 720).

If a negative determination is reached at decision block 718, or if decision block 718 is not present, then decision block 722 may follow. At decision block 722, the recipient device 102 (e.g., via the app in that device and/or the control circuit 204 in that device) may determine whether the battery in the recipient device has reached the point of being fully charged. If so, then the process of FIG. 7 may advance from decision block 722 to block 720 (end of charge sharing operation). Otherwise, the process may loop back to decision block 718 (if present) or the process may idle until the charging of the battery in device 102 is completed.

Considering again block 720, in some embodiments this block may entail the control circuit 204 of device 102 controlling the state of switch 506 (FIG. 5) such that the switch 506 de-couples the power-receiving circuit 504 in the device 102 from the loop antenna 226 in the device 102; and also may entail the control circuit 204 of device 104 controlling the state of the switch 510 in device 104 such that the switch 510 de-couples the power-transmitting circuit 508 in the device 104 from the loop antenna 226 in the device 104. In some embodiments, intercommunication between the respective apps may trigger one or both of these switch-control steps. In addition, the control circuit in the donor device 104 may turn off the power-transmitting circuit 508 in donor device 104.

In some embodiments, if the device 104 detects that the charge draw-down limit is reached, it may take itself out of charge-transmitting mode and the device 102 may then detect that it is no longer receiving charge, and may take itself out of charge-receiving mode. Or, if the device 102 detects that it has become fully charged, it may take itself out of charge-receiving mode, and the device 104 may then detect that charge is no longer being drawn, and may accordingly take itself out of charge-transmitting mode. In connection with occurrences such as these, the apps in the two devices may exchange confirming messages and/or the touchscreen(s) on one or both devices may display messages to inform the user(s) that charging has been completed/terminated.

Referring again to FIGS. 4 and 6, a tablet computer according to some embodiments may have separate antennas for charge-donating and charge-receiving (and may lack NFC capability). In such a case, the tablet computer may have two different marked regions on the outside surface of its housing—one for guiding placement of a smartphone that is to receive charge from the tablet computer, and the other for guiding placement of a smartphone that is to donate charge to the tablet computer.

In discussion up to this point, smartphones and/or tablet computers have been identified as devices to and/or from which battery charge may be shared on a mobile-to-mobile basis. Another possible candidate, at least to receive charge, could be a Bluetooth headset; the latter type of device should also be deemed a mobile device for purposes of the appended claims.

In many situations, because a tablet computer typically has a larger battery than a smartphone, it may make sense for a tablet computer to serve as a donor device in mobile-to-mobile charge sharing as described herein, and for a smartphone to be a recipient device. Nevertheless, the teachings of the present disclosure are not at all limited to this type of situation. Thus, a smartphone may be a donor device to a tablet computer by mobile-to-mobile charge sharing in some situations. And in others, as suggested by FIG. 1, both donor and recipient devices in a case of mobile-to-mobile charge sharing may be smartphones. Moreover, in another case of mobile-to-mobile charge sharing, both donor and recipient devices may be tablet computers. Other combinations of donor/recipient devices are also possible. A "mobile device" will be understood to include any device having mobile communication capabilities.

In some embodiments described above, a limit for a charge-sharing operation was set relative to a level of charge to be left in the battery of the donor device. Alternatively, or in addition, a limit for the charge-sharing operation may be set in terms of a target level of charge to be reached in the battery of the recipient device. In some embodiments, both types of limits may be set for the same charge-sharing operation, with the operation being halted in response to the first of the two limits that is reached.

With the devices and processes as described herein, users of mobile devices may have additional options for recharging the mobile device batteries, beyond what has been available according to the prior art. For example, a device user who carries both a smartphone and a tablet computer as described herein may find it convenient, indeed sometimes a "life saver" (figuratively speaking), to be able to top up the charge in his/her smartphone from the tablet computer by inductive coupling between the two devices. Conveniently, no charging cable or separate device would be needed for such an operation. In other cases, a low-battery "bind" may be readily relieved by transferring battery charge from a colleague's (or even a passer-by's) smartphone to one's own smartphone. Again, with charge-sharing by inductive coupling between the two mobile devices, one need not have a dedicated charging cable or device on hand.

In some embodiments, the apps in the recipient and donor devices may cooperate to enable a financial transfer from the user of the recipient device to the user of the donor device to compensate the latter user for the sharing of battery charge.

The above description and/or the accompanying drawings are not meant to imply a fixed order or sequence of steps for any process referred to herein; rather any process may be performed in any order that is practicable, including, but not limited to simultaneous performance of steps indicated as sequential.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A mobile device comprising:
a housing;
an antenna contained and/or supported by the housing and including a plurality of loops;
a power-receiving circuit contained by the housing, said power-receiving circuit selectively connectable to the antenna;
a power-transmitting circuit contained in the housing, said power-transmitting circuit selectively connectable to the antenna;
a short-range communications circuit contained in the housing and selectively connectable to the antenna, the short-range communications circuit for sending and/or receiving data communications signals via the antenna; and switching circuitry coupled to the antenna, the power-receiving circuit, the power-transmitting circuit and the short-range communications circuit such that:

when the power-receiving circuit is connected to the antenna, the power-receiving circuit is effectively coupled to a first number of said loops of the antenna;

when the power-transmitting circuit is connected to the antenna, the power-transmitting circuit is effectively coupled to a second number of said loops of the antenna; and when the short-range communications circuit is connected to the antenna, the short-range communications circuit is effectively coupled to a third number of said loops of the antenna;

said first, second and third numbers of antenna loops not all being equal to each other.

2. The mobile device of claim 1, wherein the short-range communications circuit is configured to engage in data communications in accordance with the NFC (near field communications) standard.

3. The mobile device of claim 1, wherein the antenna is a first antenna; the mobile device further comprising:

a second antenna contained and/or supported by the housing; and a voice communications transceiver circuit contained in the housing and coupled to the second antenna.

\* \* \* \* \*